(12) United States Patent
Carlson et al.

(10) Patent No.: US 7,411,020 B2
(45) Date of Patent: Aug. 12, 2008

(54) WATER-BASED RELEASE COATING CONTAINING FLUOROCHEMICAL

(75) Inventors: James G. Carlson, Lake Elmo, MN (US); John C. Clark, White Bear Lake, MN (US); James P. DiZio, St. Paul, MN (US); David J. Kinning, Woodbury, MN (US); Ramesh C. Kumar, Maplewood, MN (US); Chetan P. Jariwala, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 213 days.

(21) Appl. No.: 11/027,606

(22) Filed: Dec. 28, 2004

(65) Prior Publication Data

US 2006/0141194 A1 Jun. 29, 2006

(51) Int. Cl.
*C09D 133/00* (2006.01)
*B32B 33/00* (2006.01)

(52) U.S. Cl. .................. 525/119; 525/200; 525/902; 524/220; 524/460; 524/504; 524/520; 523/201; 526/201

(58) Field of Classification Search .............. 524/220, 524/460, 504, 520; 525/199, 200, 902; 526/201; 523/201
See application file for complete search history.

(56) References Cited

U.S. PATENT DOCUMENTS

| | | | |
|---|---|---|---|
| 3,011,988 A | 12/1961 | Luedke et al. |
| 3,282,905 A | 11/1966 | Fasick et al. |
| 3,318,852 A | 5/1967 | Dixon |
| 3,378,609 A | 4/1968 | Fasick et al. |
| 3,398,182 A | 8/1968 | Guenthner et al. |
| 3,413,226 A | 11/1968 | Coleman |
| 3,455,889 A | 7/1969 | Coleman |
| 4,321,404 A | 3/1982 | Williams et al. |
| 4,366,300 A | 12/1982 | Delescluse |
| 4,513,059 A | 4/1985 | Dabroski |
| 4,792,444 A | 12/1988 | Fukasawa et al. |
| 4,920,190 A | 4/1990 | Lina et al. |
| 5,093,398 A | 3/1992 | Rottger et al. |
| 5,115,059 A | 5/1992 | Le |
| 5,144,056 A | 9/1992 | Lina et al. |
| 5,173,547 A | 12/1992 | Rottger et al. |
| 5,446,118 A | 8/1995 | Shen et al. |
| 5,725,789 A | 3/1998 | Huber et al. |
| 5,872,180 A | 2/1999 | Michels et al. |
| 5,883,175 A | 3/1999 | Kubo et al. |
| 6,001,923 A | 12/1999 | Moncur et al. |
| 6,114,045 A | 9/2000 | Juhue et al. |
| 6,121,143 A | 9/2000 | Messner et al. |
| 6,238,798 B1 | 5/2001 | Kang et al. |
| 6,265,060 B1 | 7/2001 | Arudi et al. |
| 6,482,911 B1 | 11/2002 | Jariwala et al. |
| 6,500,439 B1 | 12/2002 | Morita et al. |
| 6,664,354 B2 | 12/2003 | Savu et al. |
| 6,750,277 B1 | 6/2004 | Yamana et al. |
| 6,803,109 B2 | 10/2004 | Qiu et al. |
| 6,890,360 B2 | 5/2005 | Cote et al. |
| 6,939,580 B2 | 9/2005 | Enomoto et al. |
| 2003/0026997 A1 | 2/2003 | Qiu et al. |
| 2003/0083448 A1 | 5/2003 | Fan et al. |
| 2003/0130457 A1 | 7/2003 | Maekawa et al. |
| 2004/0147188 A1 | 7/2004 | Johnson et al. |
| 2005/0106326 A1 | 5/2005 | Audenaert et al. |

FOREIGN PATENT DOCUMENTS

| | | |
|---|---|---|
| EP | 0 225 826 | 6/1987 |
| EP | 0 712 046 | 5/1996 |
| EP | 712046 A1 | 5/1996 |
| EP | 0 849 392 A2 | 6/1998 |
| EP | 1 329 548 | 7/2003 |
| EP | 1329548 A1 | 7/2003 |
| EP | 1 380 628 A1 | 1/2004 |
| FR | 1 468 301 | 2/1967 |
| GB | 870022 | 6/1961 |
| JP | 61-148208 | 7/1986 |
| WO | WO 97/14842 | 4/1997 |
| WO | WO 03/048224 A1 | 6/2003 |
| WO | WO 03/062521 A1 | 7/2003 |
| WO | WO 2005/065164 A2 | 7/2005 |
| WO | WO 2005/066224 | 7/2005 |

*Primary Examiner*—Kelechi C Egwim
(74) *Attorney, Agent, or Firm*—Thomas M. Spielbauer

(57) ABSTRACT

In one aspect, the invention provides a water-based release coating composition comprising a mixture of: A. from 0.1 to about 5 wt % of a fluoro(meth)acrylate (co)polymer or a fluorochemical urethane compound containing at least one fluorinated group having the formula —$CF_2)_nCF_3$, wherein n is an integer from 1 to 3; B. from about 5 to about 99.9 wt % of a copolymer comprising the reaction product of a. from about 40 to about 70 wt % of an alkyl (meth)acrylate, wherein the alkyl group contains from 16 to 22 carbon atoms, b. from about 3 to about 20 wt % of (meth)acrylic acid, c. from about 20 to about 40 wt % acrylonitrile, and d. from 0 to about 15 wt % of vinyl monomer, other than acrylonitrile, wherein the sum of a. through d. equals 100%; and C. from 0 to about 94.9 wt % of an extender polymer, wherein the sum of A., B., and C. is 100% and wt % is based on the total amount of solids in the composition.

24 Claims, No Drawings

WATER-BASED RELEASE COATING CONTAINING FLUOROCHEMICAL

BACKGROUND

The invention relates to release compositions useful in release layers of release articles (e.g., release liners) and adhesive articles (e.g., pressure sensitive adhesive tapes (PSA)).

Polymeric release materials are known to be used in release layers in release articles (e.g., release liners) and adhesive articles (e.g., adhesive tapes) in order to provide a surface from which an adhesive can be easily and cleanly removed. For example, it is known to apply a polymeric release material to the back surface of an adhesive tape (e.g., masking tape) in order to allow the tape to be provided in roll form and to be easily and conveniently dispensed by unwinding the roll. The release coating is expected to reproducibly provide an appropriate unwind force throughout the lifetime of the tape roll, and to not deleteriously affect the adhesive.

The *Handbook of Pressure Sensitive Adhesive Technology*, $2^{nd}$ Ed., D. Sat as Ed., Van Nostrand Reinhold, N.Y., 1989, Chapter 23, describes polymers which may be used as release agents for PSA tapes. Various polymers of lower critical surface tension such as silicones, fluorine containing polymers, and long alkyl side chain polymers are useful as release coatings. Long alkyl side chain polymers generally contain 16-20 carbon atoms in the alkyl side chains, and can be used to prepare release coatings that provide medium release forces which are especially desirable for PSA tapes. For example, GB 870,022 describes the use of copolymers prepared from octadecyl acrylate, acrylonitrile, acrylic acid, and methyl acrylate for tape release coatings.

The use of polymers or copolymers containing fluoroalkyl side groups has also been disclosed (U.S. Pat. No. 3,318,852). It has been found that the perfluoroalkyl groups need to contain at least 6 carbon atoms, and preferably at least 8 carbon atoms, in order for the polymer to provide sufficiently low unwind forces for tape rolls. However, it has been reported that certain perfluorooctyl-containing compounds may tend to bioacummulate in living organisms, raising concerns about their use. Recently, it has been found that perfluorobutyl-containing compounds are eliminated from the body much more effectively.

In the case of masking tapes, the release coating is expected to provide moderate unwind force, between about 10-40 N/dm. If the unwind force is too low, the tape roll may inadvertently unwind under its own weight, and if the unwind force is too high, the tape roll will be difficult to unwind. In addition, the unwind force should be relatively stable over the lifetime of the roll. Another common requirement for masking tapes is that the release coating on the tape backside should provide good wetting and anchorage of both water and solvent based paints. Poor paint wetting and anchorage can result in paint flaking when the masking tape is removed from the substrate, thereby ruining the appearance of the freshly painted surface. Still another common requirement for masking tapes is that they have good holding power to their own backing. For example, in a paint-draping situation, one piece of masking tape may be used to attach a drape onto another piece of masking tape, that is, overtaping, that had been placed onto the surface to establish a paint line. Typically, improving one of these masking tape property requirements can result in a deterioration of another property. For example, in the case of a more aggressive PSA, a release coating that can provide easier and more stable release must be employed; however, such release coatings may not provide good paint wetting/anchorage or sufficient holding power to backing. In such cases, a compromise in overall release coating performance features must be reached.

One commonly used method of forming a release layer is to coat the release material from an organic solvent-based solution onto a substrate. After the solution has been applied to the substrate, the solvent is evaporated leaving behind a relatively uniform coating of the release material. As environmental regulations tighten, release materials that can be processed using organic solvent-free processes are more desirable.

SUMMARY

In one embodiment, the invention provides a water-based release coating composition comprising a mixture of A. from 0.1 to about 5 wt % of a fluoro(meth)acrylate (co)polymer or a fluorochemical urethane compound containing at least one fluorinated group having the formula —$(CF_2)_nCF_3$, wherein n is an integer from 1 to 3;

B. from about 5 to about 99.9 wt % of a copolymer comprising the reaction product of
  a. from about 40 to about 70 wt % of an alkyl (meth)acrylate, wherein the alkyl group contains from 16 to 22 carbon atoms,
  b. from about 3 to about 20 wt % of (meth)acrylic acid,
  c. from about 20 to about 40 wt % acrylonitrile, and
  d. from 0 to about 15 wt % of vinyl monomer, other than a. through c. above, wherein the sum of a. through d. equals 100%; and C. from 0 to about 94.9 wt % of an extender polymer, wherein the sum of A., B., and C. is 100% and wt % is based on the total amount of solids in the composition.

In another embodiment, the invention provides an adhesive article comprising a backing having first and second surfaces, an adhesive on at least a portion of the first surface of the backing; and a water-based release composition as described herein on at least a portion of the second surface of the backing.

DETAILED DESCRIPTION

As used herein:

"(meth)acrylic or (meth)acrylate" refers to both acrylic or acrylate monomers and methacrylic/methacrylate monomers; and "fluorochemical urethane compound" means a compound derived or derivable from the reaction of at least one polyfunctional isocyanate compound and at least one hydrophilic polyoxyalkylene compound, one or more fluorinated monofunctional compounds; and one or more isocyanate-reactive silane compounds.

Surprisingly, it has been found that the addition of relatively small amounts of fluorochemical copolymers, containing short 3-4 carbon perfluoroalkyl groups, to alkyl (meth)acrylate based release polymers, and their blends with emulsion extender polymers, has been found to provide improved holding power to backing without significantly increasing the release force or sacrificing paint wetting or paint flaking resistance. Such release polymers are therefore ideal for use as masking tape release coatings.

Holding power to backing failures tend to be a low rate peel phenomenon, therefore increasing the peel force provided by the release coating at low peel rates results in improved holding power to backing performance.

Blending of the release polymer with an inexpensive polymer emulsion extender is an option to further improve tape properties, such as paint wetting and flaking resistance, and to lower the cost of the release coating.

Some of the advantages of the water-based release compositions of the invention include that the compositions: maintain desired release force; permit adhesives to exhibit relatively high peel forces at relatively low peel rates leading to improved overtaping and holding power to backing; provide good paint wetting and paint flaking resistance; and maintain re-adhesion strength with little or no release composition transfer to the adhesive.

The water-based release compositions of the invention contain (A.) from 0.1 to about 5 wt %, in other embodiments, from 0.5 to about 2.5 wt % of a fluoro(meth)acrylate (co) polymer or a fluorochemical urethane compound having at least one perfluoro group having the formula $-(CF_2)_nCF_3$, wherein n is an integer from 1 to 3, or 2 to 3 or 1 to 2, or 3. The polymer may generally be selected from fluoro(meth)acrylates and fluorochemical urethane compounds. In general, those fluoro(meth)acrylates and fluorochemical urethane compounds suitable for use with textiles to provide, for example, water and/or stain repellency, are suitable for use in the compositions of the invention.

In one embodiment, a fluoro(meth)acrylate comprises the reaction product of fluorinated monomer (i), a chlorine containing comonomer (ii) and a further monomer (iii), other than a fluorinated monomer (i) or the chlorine containing comonomer (ii), wherein the sum of (i), (ii), and (iii) equals 100%.

The fluorinated monomer (i) is typically an ester of an α,β-ethylenically unsaturated carboxylic acid and contains a fluoroaliphatic group. The fluorinated monomer can be represented by the general formula $$R_f\text{—}X\text{—}OC(O)\text{—}C(R)\text{=}CH_2 \quad (I)$$

wherein $R_f$ represents a perfluorinated aliphatic group having 3 or 4 carbon atoms, X is an organic divalent linking group, and R represents hydrogen or a lower alkyl group having 1 to 4 carbon atoms.

The perfluorinated aliphatic group $R_f$ is a perfluorinated, monovalent aliphatic radical containing 3 or 4 carbon atoms. It can be straight chain or branched chain. Suitable fluorinated monomers are those of which the $R_f$-group is of the formula $C_4F_9$-.

The linking group X links the perfluoroaliphatic group $R_f$ to the free radical polymerizable group. Linking group X is generally non-fluorinated and preferably contains from 1 to about 20 carbon atoms. X can optionally contain oxygen, nitrogen, or sulfur-containing groups or a combination thereof, and X is free of functional groups that substantially interfere with free-radical polymerization (e.g., polymerizable olefinic double bonds, thiols, and other such functionality known to those skilled in the art). Examples of suitable linking groups X include straight chain, branched chain or cyclic alkylene, arylene, aralkylene, sulfonyl, sulfoxy, sulfonamido, carbonamido, carbonyloxy, urethanylene, ureylene, and combinations thereof such as sulfonamidoalkylene.

Specific examples of fluorinated monomers include:
$CF_3CF_2CF_2CF_2CH_2CH_2OCOCR^1\text{=}CH_2$
$CF_3(CF_2)_3CH_2OCOCR^1\text{=}CH_2$
$CF_3(CF_2)_3SO_2N(CH_3)CH_2CH_2OCOCR^1\text{=}CH_2$
$CF_3(CF_2)_3SO_2N(C_2H_5)CH_2CH_2OCOCR^1\text{=}CH_2$
$CF_3(CF_2)_3SO_2N(CH_3)CH_2CH(CH_3)OCOCR^1\text{=}CH_2$
$(CF_3)_2CFCF_2SO_2N(CH_3)CH_2CH_2OCOCR^1\text{=}CH_2$ wherein $R^1$ is hydrogen or methyl.

The fluorinated monomer or mixture thereof is typically used in amounts such that the amount of the corresponding units thereof in the polymer is between 10 and 97 mole %, preferably between 25 and 97 mole %, more preferably between 25 mole % and 85 mole %, most preferably between 25 mole % and 75 mole %.

The chlorine containing comonomer (ii) used in the preparation of the fluoropolymer, can be selected from the group consisting of vinyl chloride and vinylidene chloride. The chlorine containing comonomer or mixture thereof, is typically used in amounts such that the amount of the corresponding units thereof in the polymer is between 3 and 75 mole %, preferably between 5 and 65 mole %, and more preferably between 15 and 65 mole %.

The comonomer (iii), other than a fluorinated monomer and the chlorine containing monomer (ii), is a non-fluorinated monomer and is for example a hydrocarbon group containing monomer such as monomers that can be represented by formula:

$$R_h\text{-L-Z} \quad (II)$$

wherein $R_h$ represents an aliphatic group having 4 to 30 carbon atoms, L represents an organic divalent linking group, and Z represents an ethylenically unsaturated group. The hydrocarbon group is preferably selected from the group consisting of a linear, branched or cyclic alkyl group, an aralkyl group, an alkylaryl group and an aryl group.

Examples of non-fluorinated comonomers include hydrocarbon esters of an α,β-ethylenically unsaturated carboxylic acid. Examples include n-butyl(meth)acrylate, isobutyl (meth)acrylate, octadecyl(meth)acrylate, lauryl(meth)acrylate, cyclohexyl (meth)acrylate, cyclodecyl (meth)acrylate, isobornyl (meth)acrylate, phenyl (meth)acrylate, benzyl (meth)acrylate, adamantyl (meth)acrylate, tolyl (meth)acrylate, 3,3-dimethylbutyl (meth)acrylate, (2,2-dimethyl-1-methyl)propyl (meth)acrylate, cyclopentyl (meth)acrylate, 2-ethylhexyl (meth)acrylate, t-butyl (meth)acrylate, cetyl (meth)acrylate, stearyl (meth)acrylate, behenyl (meth)acrylate, isooctyl (meth)acrylate, n-octyl(meth)acrylate, 4-ethylcyclohexyl(meth)acrylate,2-ethoxyethyl methacrylate and tetrahydropyranyl acrylate. Further non-fluorinated comonomers include allyl esters such as allyl acetate and allyl heptanoate; alkyl vinyl ethers or alkyl allyl ethers such as cetyl vinyl ether, dodecylvinyl ether, ethylvinyl ether; unsaturated acids such as acrylic acid, methacrylic acid, alpha-chloro acrylic acid, crotonic acid, maleic acid, fumaric acid, itaconic acid and their anhydrides and their esters such as vinyl, allyl, methyl, butyl, isobutyl, hexyl, heptyl, 2-ethylhexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha,beta-unsaturated carboxylic acid derivatives such as allyl alcohol, allyl glycolate, acrylamide, methacrylamide, n-diisopropyl acrylamide, diacetoneacrylamide, aminoalkyl (meth)acrylates such as N,N-diethylaminoethylmethacrylate, N-t-butylaminoethylmethacrylate; alkyl(meth)acrylates having an ammonium group such as (meth)acrylates of the formula $X^-R_3N^+\text{—}R^a\text{—}OC(O)\text{—}CR^1\text{=}CH_2$ wherein $X^-$ represents an anion such as e.g., a chloride anion, R represents hydrogen or an alkyl group and each R may be the same or different, $R^a$ represents an alkylene and $R^1$ represents hydrogen or methyl; styrene and its derivatives such as vinyltoluene, alpha-methylstyrene, alpha-cyanomethyl styrene; lower olefinic hydrocarbons which can contain halogen such as ethylene, propylene, isobutene, 3-chloro-1-isobutene, butadiene, isoprene, chloro and dichlorobutadiene and 2,5-dimethyl-1,5-hexadiene.

Comonomers (iii) or mixtures thereof may be used in amounts such that the amount of monomers (i), (ii), and (iii) equals 100 mole %. Hydrocarbon comonomers of formula (II) above may be used in an amount such that the amount of the corresponding units in the polymer is up to 72 mole %, preferably 3 to 30 mole %.

The above fluoro(meth)acrylate is typically prepared by free radical polymerisation e.g., by emulsion polymerisation or mini-emulsion polymerisation techniques. Various surfactants such as anionic, cationic, non-ionic, or amphoteric surfactants may be employed. They can be used alone or in combination. The polymerisation can be a thermal or photochemical polymerisation, carried out in the presence of a free radical initiator. Useful free radical initiators are known in the art and include azo compounds, such as azobisisobutyronitrile (AIBN), azobisvaleronitrile and azobis(2-cyanovaleric acid), 2,2'-azobis(2-amidinopropane)dihydrochloride and the like, hydroperoxides such as cumene, t-butyl, and t-amyl hydroperoxide, dialkyl peroxides such as di-t-butyl and dicumylperoxide, peroxyesters such as t-butylperbenzoate and di-t-butylperoxy phtalate, diacylperoxides such as benzoyl peroxide and lauroyl peroxide.

The polymerization may further be carried out in the presence of a chain transfer agent or a chain terminator to tailor the molecular weight and/or properties of the fluorochemical copolymer. Typically, the fluorochemical copolymer of the present invention has a weight average molecular weight between 5000 and 1,000,000, in other embodiments, between 5000 and 500,000.

Other such fluoro(meth)acrylates as well as methods of making such fluoro(meth)acrylates may be found in U.S. application Ser. No. 10/500,525, filed on Nov. 27, 2002, incorporated by reference in this application for the description of fluoro(meth)acrylates and methods of making same.

Other useful fluoro(meth)acrylates are described in U.S. application No. 11/027,604, filed on Dec. 28, 2004.

A specific example of such fluoro(meth)acrylate is shown below as formula:

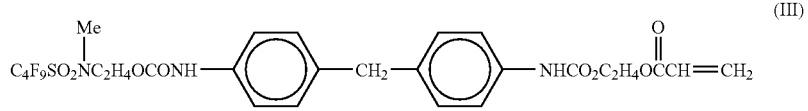

(III)

In another embodiment of the invention, the fluorochemical urethane compound(s) comprises the reaction product of (a) one or more polyfunctional isocyanate compounds; (b) one or more hydrophilic polyoxyalkylene compounds; (c) one or more fluorochemical monofunctional compounds; and (d) one or more isocyanate-reactive silane compounds.

Each fluorochemical urethane compound comprises a urethane group that is derived or derivable from the reaction of at least one polyfunctional isocyanate compound and at least one hydrophilic polyoxyalkylene compound. The fluorochemical urethane compound is terminated, on average, with (i) one or more perfluoroalkyl groups, one or more perfluoroheteroalkyl groups; and (ii) one or more silyl groups. It will be understood that the reaction product will provide a mixture of compounds, some percentage of which will comprise compounds as described, but may further comprise urethane compounds having different substitution patterns and degree of substitution.

Desirable polyfunctional isocyanate compounds contain at least two and in other embodiments, three or more —NCO groups. Compounds containing two —NCO groups are comprised of divalent aliphatic, alicyclic, araliphatic, or aromatic moieties to which the —NCO radicals are attached. Preferred compounds containing three —NCO radicals are comprised of isocyanatoaliphatic, isocyanatoalicyclic, or isocyanatoaromatic, monovalent moieties, which are attached to a biuret or an isocyanurate.

Hydrophilic polyoxyalkylene compounds suitable for use in preparing the fluorochemical urethane compounds include those polyoxyalkylene compounds that have an average functionality of greater than 1 (preferably, about 2 to 5; more preferably, about 2 to 3; most preferably, about 2, as difunctional compounds such as diols are most preferred). The isocyanate-reactive groups can be primary or secondary, with primary groups being preferred for their greater reactivity. Mixtures of compounds having different functionalities, for example, mixtures of polyoxyalkylene compounds having one, two and three isocyanate-reactive groups, may be used provided the average is greater than 1. The polyoxyalkylene groups include those having 1 to 3 carbon atoms such as polyoxyethylene, polyoxypropylene, and copolymers thereof such as polymers having both oxyethylene and oxypropylene units.

Fluorochemical monofunctional compounds suitable for use in preparing the fluorochemical urethane compound(s) of the present invention include those that comprise at least one $R_f$ group. Perfluorinated aliphatic groups (i.e., those of the formula $C_nF_{2n+1}$—) wherein n is 3 to 4 are particularly useful. It is also desirable that any $R_f$ group contain at least about 40% fluorine by weight, more preferably at least about 50% fluorine by weight.

Useful fluorochemical monofunctional compounds include compounds of the following formula:

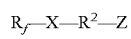

wherein:
$R_f$ is a perfluoroalkyl group group as defined above;
X is a connecting group selected from a covalent bond, a sulfonamido group, a carboxamido group, a carboxyl group, or a sulfonyl group; and
$R^2$ is a divalent straight or branched chain alkylene, cycloalkylene, or heteroalkylene group of 1 to 14 carbon atoms, in other embodiments, 1 to 8 carbon atoms, 1 to 4 carbon atoms, and two carbon atoms, and Z is an isocyanate-reactive functional groups, for example —NH$_2$; —SH; —OH; —N=C=O; or —NRH where R is H or a C$_1$-C$_4$ alkyl.

Silane compounds suitable for use in the above fluorochemical urethane compound(s) of the present invention are those of the following formula:

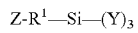

Z-R$^1$—Si—(Y)$_3$ wherein Z is defined above, R$^1$ is an alkylene, heteroalkylene, aralkylene, or heteroaralkylene group; and Y is independently a hydroxy; a hydrolyzable moiety selected from the group consisting of alkoxy, acyloxy, heteroalkoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety. Therefore, these silane compounds contain one, two, or three hydrolysable groups (Y) on the silicon and one organic group including an isocyanate-reactive or an active hydrogen reactive radical (Z-R$^1$). Any of the conventional hydrolysable groups, such as those selected from the group consisting of alkoxy, acyloxy, heteroalkoxy, heteroacyloxy, halo, oxime, and the like, can be used as the hydrolyzable group (Y). The hydrolysable group (Y) is preferably alkoxy or acyloxy and more preferably alkoxy. Specific examples of fluorochemical urethane compound(s), and monomers used to make such compounds (hydrophilic polyoxyalkylene compounds, fluorochemical monofunctional compounds, and silane compounds) are found in U.S. Publication No. 2003/0149218A1, incorporated by reference in this application for the description of fluorochemical urethane compounds and methods of making such compounds.

The water-based release compositions of the invention contain (B.) from about 5 to about 99.9 wt %, in another embodiment, 15 to 50 wt %, of a copolymer comprising the reaction product of monomers (a.) about 40 to about 70, in other embodiments, 45 to 60, wt % alkyl (meth)acrylate, wherein the alkyl group contains from 16 to 22 carbon atoms, (b.) from about 3 to about 20, in other embodiments, 8 to 12, wt % of (meth)acrylic acid, (c.) from about 20 to about 40, in other embodiments, 25 to 35 wt % acrylonitrile, and (d.) from 0 to about 15 wt % of vinyl monomer, other than those of (a.) through (c.) above, wherein the sum of (a.) through (d.) equals 100%.

Examples of useful alkyl (meth)acrylates having from 16 to 22 carbon atoms in the alkyl group, include octadecyl acrylate, octadecyl methacrylate, behenyl acrylate and combinations thereof.

Examples of other vinyl monomers which may be copolymerized in small amounts into the release copolymer include alkyl (meth)acrylates, wherein the alkyl group contains from 1 to about 8 carbon atoms, including methyl (meth)acrylate, butyl (meth)acrylate, iso-octyl (meth)acrylate, 2-ethylhexyl (meth)acrylate and combinations thereof. Additional examples include styrene and vinyl acetate and combinations thereof.

The water-based release compositions of the invention contain (C.) from 0 to about 94.9 wt %, in other embodiments, 0 to 84.5, and 50 to 90 wt % of extender polymer. Extender polymers tend to reduce cost while improving paint wetting and flaking resistance. Useful extender polymers are in the form of polymeric emulsions. Examples of suitable polymer emulsions include those based on polyvinyl acetate (e.g., VINAC 884 available from Air Products Inc., Allentown, Pa.), vinyl acetate/ethylene copolymers (e.g., AIRFLEX 100HS, also available from Air Products), acrylic polymers (e.g., HYCAR 26138 available from Noveon Inc., Cleveland, Ohio, and RHOPLEX GL618 available from Rohm & Haas, Philadelphia, Pa.), and styrene/acrylic copolymers (e.g., VANCRYL 989 available from Air Products) and combinations thereof.

Concentrations of less than about 0.1 wt % fluorochemical component (A.) typically do not result in a significant increase in holding power to a backing (i.e., increase in peel force at low peel rates). If the fluorochemical component (A.) concentration is increased beyond about 5 wt %, the paint wetting and flaking resistance can suffer, or the adhesion of the adhesive can be decreased.

Alkyl (meth)acrylate content of less than about 40 wt % and acrylonitrile content of less than about 20 wt % in release polymer (B.) results in release forces which are higher than desired. Alkyl (meth)acrylate content higher than about 70 wt % and acrylonitrile content higher than about 35 wt % in release polymer B can result in poor paint wetting and poor paint flaking resistance. In addition, such compositions are difficult to invert into water.

Release polymer (B.) having a (meth) acrylic acid content less than about 3% are difficult to invert into water, while higher (meth) acrylic acid contents increase the polymer's hydrophilicity, resulting in poor release stability under high humidity conditions.

If the concentration of the extender polymer is increased beyond about 95 wt %, the release force may be increase and the tape roll becomes difficult to unwind.

The release compositions of the present invention may also contain other additives such as wetting agents and defoamers.

Adhesives

Adhesives useful in the present invention as the adhesive layer are preferably pressure sensitive adhesives. They are normally tacky at room temperature and can be adhered to a surface by application of, at most, light finger pressure.

The adhesives useful in the invention may generally be based on general compositions of polyacrylate; polyvinyl ether; rubber such as natural rubber; isoprene; polychloroprene; butyl rubber; polyisobutylene; butadiene-acrylonitrile polymer, thermoplastic elastomer, and styrene-butadiene polymer; poly-alpha-olefin; amorphous polyolefin; silicone; ethylene-containing copolymer such as ethylene-vinyl acetate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, curatives, and solvents.

A general description of useful pressure-sensitive adhesives may be found in Encyclopedia of Polymer Science and Engineering, Vol. 13, Wiley-Interscience Publishers (New York, 1988) and Encyclopedia of Polymer Science and Technology, Vol. 1, Interscience Publishers (New York, 1964).

Additional description of useful pressure-sensitive adhesives may be found in Handbook of Pressure Sensitive Adhesive Technology, Second Edition, Van Nostrand Reinhold Publishers (New York, 1989).

For masking tapes, pressure sensitive adhesives based on tackified natural rubber are often desired.

Backings

Backings suitable for use with the release coatings of the invention may be utilized in the practice of the present invention. Such backing can be treated or untreated paper such as crepe, rope tissue, repulpable tissue, and kraft; woven fabric such as cotton, rayon, polyester, glass, and nylon; polymeric film such as cellophane, acetate, polyester, vinyl, polyvinyl chloride, polypropylene, polyethylene, and polyimide; non-woven fabric such as a polymer scrim or web; foil such as aluminum, stainless steel, and lead; foam such as open and closed cell polyethylene, polyvinyl chloride, polyurethane, and polychloroprene; rubber, such as neoprene; metallized film, or combinations of the above, i.e., laminates. The backings can be compounded further with fibers, fillers, plasticizers, pigments, stabilizers, antioxidants, or mixtures thereof. The backings may be a single layer or of multilayer construction.

The backings may additionally bear a primer layer or be surface treated, e.g., corona treated, to promote adhesion of other components to it.

For example, crepe paper backings used for masking tapes may be coated with a barrier layer prior to application of the release layer. An example of a barrier coat includes RHOPLEX GL-618 acrylic polymer emulsion, commercially available from Rohm & Haas, Philadelphia, Pa. In addition, a primer layer may be applied onto the other side of the crepe paper to improve adhesion of the adhesive to backing.

Release coating compositions of the invention can be applied to suitable backings by conventional coating techniques such as, for example, wire-wound rod, direct gravure, offset gravure, reverse roll, air-knife, and trailing blade coating.

The adhesive articles of the invention generally comprise an adhesive composition on one surface of a backing and a water-based release composition on the other surface of the backing. The adhesive articles of the invention may be in the form of a sheet, multilayer sheets or stack or pad of sheets, or in the form of a roll, for example, a tape roll.

EXAMPLES

These examples are merely for illustrative purposes only and are not meant to be limiting on the scope of the appended claims. All parts, percentages, ratios, etc. in the examples and the rest of the specification are by weight unless indicated otherwise.

Table of Abbreviations

| | |
|---|---|
| VAZO 67 | 2,2'-azobis(2-methylbutyronitrile), available from E. I. DuPont de Nemours and Company, Wilmington, DE |
| AIRFLEX 100HS | Vinyl acetate-ethylene copolymer emulsion, 55% solids content, Tg 7° C., pH 5.5, available from Air Products and Chemicals, Inc., Allentown, PA |
| ODMA | Octadecyl methacrylate, available from Sigma-Aldrich, Milwaukee, WI |
| ODA | Octadecyl acrylate, available from Sigma-Aldrich |
| ACN | Acrylonitrile, available from Sigma-Aldrich |
| AA | Acrylic acid, available from Sigma-Aldrich |
| MA | Methyl acrylate, available from Sigma-Aldrich |
| $VCl_2$ | Vinylidene chloride, available from Sigma-Aldrich |
| AP-1 | 58/29/10/3 wt % ODA/ACN/AA/MA copolymer, prepared as described in Example 1 below |
| MeFBSE | N-methyl perfluorobutanesulfonamidoethanol, $C_4F_9SO_2N(CH_3)CH_2CH_2OH$, prepared by essentially following the procedure described in U.S. Pat. No. 6,664,354 (Savu et al.), Example 2, Part A |
| MeFBSEMA | N-methyl perfluorobutanesulfonamidoethyl methacrylate, $C_4F_9SO_2N(CH_3)CH_2CH_2OC(=O)C(CH_3)=CH_2$, prepared by essentially following the procedure described in U.S. Pat. No. 6,664,354 (Savu et al.), Example 2, Parts A and B, except using methacrylic acid instead of acrylic acid |
| N3300 | DESMODUR ™ N-3300; eq wt = 194, polyfunctional isocyanate resin based on hexamethylene diisocyanate, available from Bayer, Pittsburgh, PA |
| PEG 1450 | CARBOWAX 1450; Polyethylene glycol ($MW_{av}$ = 1450), available from Union Carbide, Danbury, CT |

-continued

Table of Abbreviations

| | |
|---|---|
| APTMS | 3-aminopropyltrimethoxysilane; $NH_2(CH_2)_3Si(OCH_3)_3$, available from Sigma-Aldrich |
| FC-1 | 60/20/20 wt % MeFBSEMA/$VCl_2$/ODMA copolymer, prepared as described in Example 1 below |
| FC-2 | MeFBSE/N3300/PEG 1450/APTMS fluorochemical urethane, prepared as described in Example 2 below |
| KC S-90104 paper | Fine-structured crepe paper pre-saturated with SBR based saturant, total basis wt. 76 gram/sq m, available from Kimberly Clark Corp., Rosewell, GA |
| RHOPLEX GL-618 | Acrylic elastomeric polymer emulsion, 47% solids, commercially available from Rhom & Haas, Philadelphia, PA |
| SILWET L-77 | Polyalkylene oxide modified polydimethylsiloxane, commercially available from Setre Chemical Company, Memphis, TN |
| Tape 1 | 233 Masking Tape commercially available from 3M Company, St. Paul, MN |
| Tape 2 | 410 Double sided Tape commercially available from 3M Company |
| PD-30 Royal Blue Enamel | Premium DECORE Acrylic Enamel Interior/Exterior Waterborne Enamel PD-30 Royal Blue, available from Tru Value Hardware, St. Paul, MN |

Test Methods

Release Force and Re-Adhesion Testing

This peel adhesion test is similar to the test method described in ASTM D 3330-90 except that the stainless steel substrate was replaced by a glass substrate. A 24 mm wide strip of Tape 1 was adhered to the release layer of a release coated backing, prepared as described in the Examples below, using a 2-kilogram (kg) hard rubber roller passed back and forth twice over the strip.

The assembly was allowed to dwell for 1 week at RT (room temperature) or for 1 day at 50° C. (heat aged). Samples were prepared for release testing by attaching the non-release side of the backing layer (KC S-90104) to a glass plate using Tape 2.

The release force was measured using an IMASS slip/peel tester (Model 3M90, commercially available from Instrumentors Inc., Strongsville, Ohio) at a peel angle of 180° and a peel rate of 2.3 m/minute (90 in./minute).

Re-adhesion values were measured by taking the tapes peeled from the release surface and rolling them onto a clean glass plate. The re-adhesion samples were then peeled on the IMASS slip/peel tester (Model 3M90) at a peel angle of 180° and a peel rate of 2.3 m/minute (90 in./minute).

Paint De-Wetting and Flaking Test

Samples were prepared for testing by brushing PD-30 Royal Blue Enamel paint onto the release-coated side of the KC S-90104 backing layer using a 2.54 cm (1 in.) wide natural boar bristle brush (Part no. 1500, commercially available from Dalco Enterprises, Inc., New Brighton, Minn.). The brush was dipped into the enamel paint until half of the bristle length was immersed into the paint. One side of the brush was wiped on the edge of the paint container to remove excess paint, and the brush was then used to deposit the paint onto the release-coated side of the backing layer with about 6 strokes back and forth. The painted area was about 3.8 cm (1.5 in.) wide and about 30.5 cm (12 in.) long. The samples were visually examined and de-wetting of the sample by the paint was recorded as "Yes" if the surface was de-wetted by the paint and "No" if the surface was not de-wetted by the paint.

The samples were allowed to dry for about 16 hours at 22° C. (72° F.) and 50% relative humidity. A 2.54 cm (1 in.) width piece was cut with a slitter from each sample. Tape 2 was placed on the unpainted side of the cut piece and the cut piece was placed on a glass plate and rolled down with 2 passes of a rubber roller. The bonded assembly dwelled at room temperature for about one minute and was peeled at a 180° peel angle using an IMASS slip/peel tester (Model 3M90) at a rate of 2.3 m/minute (90 in./minute). The samples were visually examined and the percent of paint flaking was estimated.

180° Peel Adhesion

This peel adhesion test is similar to the test method described in ASTM D 3330-90.

24 mm wide by about 20 mm long strips of Tape 1 were adhered to the release coated backings, prepared as described in the Examples below, using a 2 kg roller passed back and forth twice over each strip. The assembly was then attached to a glass plate using Tape 2, allowed to dwell at room temperature for about one minute, and Tape 1 was peeled at 180° peel adhesion using an IMASS slip/peel tester (Model 3M90) at a peel rate of 0.51 cm/minute (0.2 in./minute), 1.0 cm/minute (0.4 in./minute), 2.0 cm/minute (0.8 in./minute), 8.1 cm/minute (3.2 in./minute), 32.5 cm/minute (12.8 in./minute) or 2.3 m/minute (90 in./minute), as specified in the Examples, over various data collection times: 23 seconds for peel rates 0.51, 1.0, 2.0, and 8.1 cm/minute; 10 seconds for peel rate 32.5 cm/minute; and 5 seconds for peel rate 2.3 m/minute. Two or three measurements were taken at each peel rate; the reported peel adhesion value is an average of the measurements.

Example 1

Preparation of Release Material 1

A 22-liter flask equipped with an agitator, temperature controller with three heat lamps, condenser, nitrogen inlet and vacuum regulator was charged with 1451 g ODA solution (62.4% ODA in ethyl acetate), 452.4 g ACN, 156 g AA, 46.8 g MA, 23.4 g VAZO 67 and 3094 g ethyl acetate. The resulting mixture was heated to 65° C. while stirring. The reaction was carried out for 36 hours to form a solvent-based solution of polymer AP-1. The % solids were measured to be 29.3%.

A separate 22-liter flask equipped with an agitator, temperature controller, condenser, nitrogen inlet and vacuum regulator was charged with 3000 g of above prepared 29.3% AP-1 solvent-based solution, 6380 g deionized water and 122 g triethyl amine. The resulting dispersion was subjected to vacuum stripping from 300 to 85 mm Hg and 35° C. to 55° C. to strip off the ethyl acetate. After the solvent stopped coming off, heating and vacuum stripping were discontinued. The % solids of the resulting somewhat hazy inverted water-based dispersion of AP-1 were measured to be 12% and the pH was measured to be 7.90.

An emulsion of fluorochemical FC-1 was prepared by essentially following the procedure described in WO 03/062521 A1 (3M Innovative Properties, Inc., Audenaert et al.), Example 30, except that the molar ratios of MeFB-SEMA/ODMA/VCl$_2$ used were 35/15/50 (60/20/20 by weight). The % solids of the water-based emulsion was 48%.

100 parts by wt. of 12% AP-1 inverted water-based dispersion and 0.25 parts by wt. 48% FC-1 emulsion were shaken together in a glass vial. The FC-1/AP-1 mixture was further diluted with deionized water to 6% by wt. solids and then 0.01 wt % SILWET L-77, based on total solids content of FC-1/AP-1, was added to form Release Material 1.

Preparation of Release Coated Backing

RHOPLEX GL-618 was diluted with deionized water to 35% solids and coated onto KC S-90104 paper backing layer using a #6 coating rod. The coated paper was dried for 2 minutes at 100° C.

Release Material 1 prepared above was coated over the RHOPLEX GL-618 using a #6 coating rod. The release-coated sample was then dried for 2 minutes at 150° C. to provide a release coated backing.

The release coated backing was tested for Release Force, Re-adhesion, Paint De-wetting and Flaking, and 180° Peel Adhesion using the test methods described above. The results are shown in Tables 1 and 2.

Comparative Example 1

Preparation of Release Material C-1

A portion of the inverted water-based dispersion of AP-1, prepared in Example 1, was diluted with water to 6% by wt. solids and then 0.01 wt % SILWET L-77, based on the solids content of AP-1, was added to form Release Material C-1.

A release coated backing was prepared according to the procedure of Example 1 except that Release Material C-1 was used in place of Release Material 1.

The release coated backing was tested for Release Force, Re-adhesion, Paint De-wetting and Flaking, and 180° Peel Adhesion using the test methods described above. The results are shown in Tables 1 and 2.

Comparative Example 2

Preparation of Release Material C-2

A portion of FC-1, prepared in Example 1, was diluted with water to 6% by wt. solids and then 0.01 wt % SILWET L-77, based on the solids content of FC-1, was added to form Release Material C-2.

Preparation of Release Coated Backing

A release coated backing was prepared according to the procedure of Example 1 except that Release Material C-2 was used in place of Release Material 1.

The release coated backing was tested for Release Force, Re-adhesion, Paint De-wetting and Flaking, and 180° Peel Adhesion using the test methods described above. The results are shown in Tables 1 and 2.

Example 2

Preparation of Release Material 2

FC-2 was prepared as described in Preparation 6 of U.S. Publication No. 2003/0149218 A1 (Cote' et al). The % solids of the water-based emulsion was 30%.

100 parts by wt. of 12% AP-1 inverted water-based dispersion and 0.80 parts by wt. 30% FC-2 emulsion were shaken together in a glass vial.

The FC-2/AP-1 mixture was further diluted with deionized water to 6% by wt. solids and then 0.01 wt % SILWET L-77, based on total solids content of FC-2/AP-1, was added to form Release Material 2.

Preparation of Release Coated Backing

A release coated backing was prepared according to the procedure of Example 1 except that Release Material 2 was used in place of Release Material 1.

The release coated backing was tested for Release Force, Re-adhesion, Paint De-wetting and Flaking, and 180° Peel Adhesion using the test methods described above. The results are shown in Tables 1 and 2.

Comparative Example 3

Preparation of Release Material C-3

A portion of FC-2, prepared in Example 2, was diluted with water to 6% by wt. solids and then 0.01 wt % SILWET L-77, based on the solids content of FC-2, was added to form Release Material C-3.

A release coated backing was prepared according to the procedure of Example 1 except that Release Material C-3 was used in place of Release Material 1.

Preparation of Release Coated Backing

The release coated backing was tested for Release Force, Re-adhesion, Paint De-wetting and Flaking, and 180° Peel Adhesion using the test methods described above. The results are shown in Tables 1 and 2.

Example 3

Preparation of Release Material 3

100 parts by wt. of 12% AP-1 inverted water-based dispersion, 51 parts by wt. 55% (as received) AIRFLEX 100HS emulsion and 0.83 parts by wt. 48% FC-1 emulsion were shaken together in a glass vial.

The FC-1/AP-1/AIRFA LEX mixture was further diluted with deionized water to 6% by wt. solids and then 0.01 wt % SULWET L-77, based on total solids content of FC-1/AP-1/AIFLEX 100HS, was added to form Release Material 3.

Preparation of Release Coated Backing

A release coated backing was prepared according to the procedure of Example 1 except that Release Material 3 was used in place of Release Material 1.

The release coated backing was tested for Release Force, Re-adhesion, Paint De-wetting and Flaking, and 180° Peel Adhesion using the test methods described above. The Results are shown in Tables 1 and 2.

Example 4

Preparation of Release Material 4

100 parts by wt. of 12% AP-1 inverted water-based dispersion, 51 parts by wt. 55% (as received) AIRFLEX 100HS emulsion and 2.67 parts by wt. 30% FC-2 emulsion were shaken together in a glass vial.

The FC-2/AP-1/AIRFLEX 100HS mixture was further diluted with deionized water to 6% by wt. solids and 0.01 wt % SILWET L-77, based on total solids content of FC-2/AP-1/AIRFLEX 100HS, was added to form Release Material 4.

Preparation of Release Coated Backing

A release coated backing was prepared according to the procedure of Example 1 except that Release Material 4 was used in place of Release Material 1.

The release coated backing was tested for Release Force, Re-adhesion, Paint De-wetting and Flaking, and 180° Peel Adhesion using the test methods described above. The results are shown in Tables 1 and 2.

Comparative Example 4

Preparation of Release Material C-4

100 parts by wt. of 12% AP-1 inverted water-based dispersion and 51 parts by wt. 55% (as received) AIRFLEX 100HS emulsion were shaken together in a glass vial.

The AP-1/AIRFLEX 100HS mixture was further diluted with deionized water to 6% by wt. solids and then 0.01 wt % SILWET L-77, based on total solids content of AP-1/AIRFLEX 100HS, was added to form Release Material C-4.

Preparation of of Release Coated Backing

A release coated backing was prepared according to the procedure of Example 1 except that Release Material C-4 was used in place of Release Material 1.

The release coated backing was tested for Release Force, Re-adhesion, Paint De-wetting and Flaking, and 180° Peel Adhesion using the test methods described above. The Results are shown in Tables 1 and 2.

TABLE 1

| Ex. No. | Paint Dewetting | Paint Flaking, % | Release Force after RT 1 week, N/dm (oz/24 mm) | Release Force after 50° C. 1 day, N/dm (oz/24 mm) | Re-adhesion Force after RT 1 week, N/dm (oz/24 mm) | Re-adhesion Force after 50° C. 1 day, N/dm (oz/24 mm) |
|---|---|---|---|---|---|---|
| 1 | No | 10 | 21.9 (18.9) | 22.5 (19.4) | 48.8 (42.1) | 44.5 (38.4) |
| Comp. Ex. 1 | No | 0 | 20.3 (17.5) | 21.1 (18.2) | 49.0 (42.3) | 46.6 (40.2) |
| Comp. Ex. 2 | Yes | 15 | 28.1 (24.3) | 44.4 (38.3) | 47.8 (41.3) | 40.0 (34.5) |
| 2 | No | 5 | 20.0 (17.3) | 22.5 (19.4) | 47.9 (41.1) | 45.3 (39.1) |
| Comp. Ex. 3 | No | 5 | 10.0 (8.6) | 14.5 (12.5) | 38.0 (32.8) | 25.8 (22.3) |
| 3 | No | 0 | 31.7 (27.4) | 33.5 (28.9) | 47.2 (40.8) | 46.6 (40.2) |
| 4 | No | 0 | 33.5 (28.9) | 36.6 (31.6) | 47.1 (41.2) | 45.5 (39.3) |
| Comp. Ex. 4 | No | 0 | 23.4 (20.2) | 27.2 (23.5) | 47.7 (41.2) | 46.2 (39.9) |

TABLE 2

| | 180° Peel Adhesion, N/dm (oz/24 mm) | | | | | |
|---|---|---|---|---|---|---|
| Ex. No. | Peel rate 0.51 cm/minute (0.2 in./minute) | Peel rate 1.0 cm/minute (0.4 in./minute) | Peel rate 2.0 cm/minute (0.8 in./minute) | Peel rate 8.1 cm/minute (3.2 in./minute) | Peel rate 32.5 cm/minute (12.8 in./minute) | Peel rate 2.3 m/minute (90 in./minute) |
| 1 | 2.00 (1.7) | 3.0 (2.6) | 4.0 (3.5) | 7.2 (6.2) | 10.8 (9.3) | 13.3 (11.5) |
| Comp. Ex. 1 | 1.2 (1.0) | 1.8 (1.6) | 3.0 (2.60) | 7.6 (6.53) | 10.9 (9.4) | 13.4 (11.5) |
| Comp. Ex. 2 | 7.8 (6.7) | 8.8 (7.6) | 8.9 (7.7) | 8.8 (7.6) | 8.0 (6.9) | 5.0 (4.3) |
| 2 | 2.9 (2.5) | 3.8 (3.3) | 5.2 (4.5) | 8.1 (7.0) | 11.7 (10.1) | 14.2 (12.2) |
| Comp. Ex. 3 | 6.1 (5.3) | 7.0 (6.0) | 8.0 (6.9) | 9.6 (8.3) | 8.8 (7.6) | 6.3 (5.4) |
| 3 | 5.3 (4.6) | 6.4 (5.6) | 8.2 (7.1) | 13.6 (11.7) | 15.7 (13.5) | 16.7 (14.4) |
| 4 | 6.6 (5.7) | 8.0 (6.9) | 10.3 (8.9) | 12.4 (10.3) | 13.2 (11.4) | 13.0 (11.2) |
| Comp. Ex. 4 | 1.1 (0.9) | 1.8 (1.5) | 3.0 (2.6) | 7.4 (6.4) | 11.7 (10.1) | 14.9 (12.8) |

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A water-based release coating composition comprising water and solids, wherein the solids comprise a mixture of (A) from 0.1 to about 5 wt % of a fluoro(meth)acrylate (co)polymer or a fluorochemical urethane compound containing at least one fluorinated group having the formula —$(CF_2)_nCF_3$, wherein n is an integer from 1 to 3;
(B) from about 15 to about 50 wt % of a copolymer consisting of the reaction product of
  (a) from about 40 to about 70 wt % of an alkyl (meth)acrylate, wherein the alkyl group contains from 16 to 22 carbon atoms,
  (b) from about 3 to about 20 wt % of (meth)acrylic acid,
  (c) from about 20 to about 40 wt % acrylonitrile, and
  (d) from 0 to about 15 wt % of vinyl monomer, other than those monomers of a. through c. above; and
(C) from 0 to about 84.5 wt % of an extender polymer wherein the wt %'s in said mixture are based on the total weight of solids in the release composition.

2. The composition according to claim 1 wherein (A) is a fluorochemical urethane compound wherein n is 3.

3. The composition according to claim 1 wherein (A) is a fluoro(meth)acrylate (co)polymer consisting of the reaction product of
(i) a fluorinated monomer having the formula: $R_f$—X—OC(O)—C(R)=$CH_2$, wherein $R_f$ represents a perfluorinated aliphatic group having 3 or 4 carbon atoms, X is an organic divalent linking group and R represents hydrogen or a lower alkyl group having 1 to 4 carbon atoms;
(ii) a chlorine containing comonomer selected from the group consisting of vinylidene chloride, vinyl chloride and mixtures thereof; and
(iii) monomers other than a fluorinated monomer and said chlorine containing comonomers.

4. The composition according to claim 1 wherein (A) is a fluoro(meth)acrylate (co)polymer comprising a monomer having the formula:

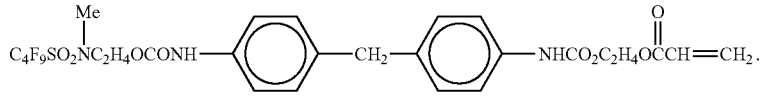

5. The composition according to claim 1 wherein (A) is a fluorochemical urethane compound, wherein the fluorochemicals urethane compound is a reaction product of:
  one or more polyfunctional isocyanate compounds;
  one or more hydrophilic polyoxyalkylene compounds;
  one or more fluorochemical monofunctional compounds; and
  one or more isocyanate-reactive silane compounds.

6. The composition according to claim 1 wherein the alkyl (meth)acrylate is selected from the group consisting of octadecyl acrylate, octadecyl methacrylate, behenyl acrylate and combinations thereof.

7. The composition according to claim 1 wherein the vinyl monomer is selected from the group consisting of methyl (meth)acrylate, butyl (meth)acrylate, iso-octyl meth)acrylate, 2-ethylhexyl (meth)acrylate, styrene, vinyl acetate, and combinations thereof.

8. The composition according to claim 1 wherein the extender polymer is an emulsion containing a material selected from the group consisting of polyvinyl acetate, vinyl acetate/ethylene copolymers, acrylic polymers, styrene/acrylic copolymers, and combinations thereof.

9. The water-based release coating composition of claim 1, wherein the solids comprise 0.5 to 2.5 wt % (A) and 15 to 50 wt % (B).

10. The water-based release coating composition of claim 9, wherein the solids comprise 50 to 84.5 wt % (C).

11. The water-based release coating composition of claim 1, further comprising additives, optionally wherein the additives are selected from the group consisting of defoamers, wetting agents, and combinations thereof.

12. The water-based release coating composition of claim 1, wherein the sum of the weight percents of (A), (B), and (C) in the solids is 100%.

13. An adhesive article comprising
a backing having first and second surfaces;
an adhesive on at least a portion of the first surface of the backing; and
a release composition on at least a portion of the second surface of the backing, wherein the release composition comprises a mixture of
(A) from 0.1 to about 5 wt % of a fluoro(meth)acrylate (co)polymer or a fluorochemical urethane compound containing at least one fluorinated group having the formula —$(CF_2)_n CF_3$, wherein n is an integer from 1 to 3;
(B) from about 15 to about 50 wt % of a copolymer consisting of the reaction product of
(a) from about 40 to about 70 wt % of an alkyl (meth)acrylate, wherein the alkyl group contains from 16 to 22 carbon atoms,
(b) from about 3 to about 20 wt % of (meth)acrylic acid,
(c) from about 20 to about 40 wt % acrylonitrile, and
(d) from 0 to about 15 wt % of vinyl monomer, other than those monomers of (a) through (c) above; and
(C) from 0 to about 84.5 wt % of an extender polymer wherein the wt %'s in said mixture are based on the total weight of solids in the release composition.

14. The adhesive article according to claim 13 wherein the adhesive article is in the form of a multi-layer sheet or a roll.

15. The adhesive article according to claim 13 wherein the backing comprises a material selected from the group consisting of treated paper, untreated paper, cotton, rayon, polyester, glass, nylon, cellophane, acetate, polyester, vinyl, polyvinyl chloride, polypropylene, polyethylene, and polyimide, aluminum, stainless steel, lead, open and closed cell polyethylene, open and closed cell polyvinyl chloride, open and closed cell polyurethane, open and closed cell polychloroprene, rubber, metallized film, and combinations thereof.

16. The adhesive article according to claim 13 wherein the adhesive comprises a material selected from the group consisting of polyacrylates, polyvinyl ether, natural rubber, isoprene, polychloroprene, butyl rubber, polyisobutylene, butadiene-acrylonitrile polymer, thermoplastic elastomer, styrene-butadiene polymer, poly-alpha-olefin, amorphous polyolefin, silicone, ethylene vinyl acetate, polyurethane, polyamide, epoxy, polyvinylpyrrolidone, vinylpyrrolidone copolymers, polyesters, and mixtures thereof.

17. The adhesive article according to claim 13 in the form of a tape.

18. The tape according to claim 17 wherein the backing comprises crepe paper.

19. The tape according to claim 18 wherein the adhesive is a pressure sensitive adhesive.

20. The tape according to claim 19 wherein the backing has a primer layer on the first surface of the backing.

21. The tape according to claim 18 wherein the fluoro (meth)acrylate copolymer is a terpolymer of octadecylmethacrylate, vinylidene chloride, and N—methyl perfluorobutanesulfonamidoethyl methacrylate.

22. The adhesive article according to claim 13, wherein the release composition comprises 0.5 to 2.5 wt % (A) and 15 to 50 wt % (B).

23. The adhesive article according to claim 22, wherein the release composition comprises 50 to 84.5 wt % (C).

24. The adhesive article according to claim 23, wherein the sum of the weight percents of (A), (B), and (C) in the release composition is 100%.

* * * * *

UNITED STATES PATENT AND TRADEMARK OFFICE
CERTIFICATE OF CORRECTION

PATENT NO.         : 7,411,020 B2
APPLICATION NO. : 11/027606
DATED                 : August 12, 2008
INVENTOR(S)       : James G. Carlson It is certified that error appears in the above-identified patent and that said Letters Patent is hereby corrected as shown below:

On the Title Page, in Column 2, under (Foreign Patent Documents)
Line 2, after "6/1987" delete "EP 0 712 046 5/1996". (Repeated Entry.)
Line 3, after "EP" insert -- * --.
Line 5, after "6/1998" delete "EP 1 329 548 7/2003". (Repeated Entry.)
Line 6, after "EP" insert -- * --.

On the Title Page, in Column 2, under (Abstract)
Line 5, delete "—$CF_2)_nCF_3$," and insert -- —$(CF_2)_nCF_3$, --, therefor.

Column 4
Line 60, delete "X-$R_3N^+$—$R^a$—" and insert -- $X^-R_3N^+$—$R^a$— --, therefor.

Column 8
Line 5, delete "fluorochernical" and insert -- fluorochemical --, therefor.

Column 10
Line 21, delete "DECORE" and insert -- DECOR --, therefor.
Line 23, delete "Tru" and insert -- True --, therefor.

Column 11
Line 60, delete "ODMANVCl$_2$" and insert -- ODMA/VCl$_2$ --, therefor.

Column 13
Line 30, delete "AIRFA LEX" and insert -- AIRFLEX --, therefor.
Line 32, delete "SULWET" and insert -- SILWET --, therefor.
Line 33, delete "AIFLEX" and insert -- AIRFLEX --, therefor.

Column 14
Line 35, before "Release" delete "of".

UNITED STATES PATENT AND TRADEMARK OFFICE
CERTIFICATE OF CORRECTION

PATENT NO. : 7,411,020 B2
APPLICATION NO. : 11/027606
DATED : August 12, 2008
INVENTOR(S) : James G. Carlson It is certified that error appears in the above-identified patent and that said Letters Patent is hereby corrected as shown below:

Column 15
Line 45, in Claim 1, delete "—$CF_2)_nCF_3$," and insert -- —$(CF_2)_nCF_3$, --, therefor.

Column 16
Line 57, in Claim 7, delete "meth)" and insert -- (meth) --, therefor.

Column 17
Line 8, in Claim 12, delete "of(A)," and insert -- of (A), --, therefor.

Column 18
Line 26, in Claim 21, delete "N— methyl" and insert -- N-methyl --, therefor.
Line 34, in Claim 24, delete "of(A)," and insert -- of (A), --, therefor.

Signed and Sealed this

Tenth Day of March, 2009

JOHN DOLL
*Acting Director of the United States Patent and Trademark Office*